US012711949B2

(12) United States Patent
Guo et al.

(10) Patent No.: US 12,711,949 B2
(45) Date of Patent: Aug. 18, 2026

(54) MULTI-MODAL ENCODER PROCESSING METHOD AND APPARATUS, COMPUTER DEVICE AND STORAGE MEDIUM

(71) Applicants: Lemon Inc., Grand Cayman (KY); Beijing Zitiao Network Technology Co., Ltd., Haidian District (CN)

(72) Inventors: Dong Guo, Culver City, CA (US); Zihao He, Culver City, CA (US); Weituo Hao, Los Angeles, CA (US); Xuchen Song, Los Angeles, CA (US); Zongyu Yin, London (GB); Jingsong Gao, Los Angeles, CA (US); Wei Tsung Lu, Los Angeles, CA (US); Junyu Dai, Beijing (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 174 days.

(21) Appl. No.: 18/819,280

(22) Filed: Aug. 29, 2024

(65) Prior Publication Data

US 2025/0078814 A1 Mar. 6, 2025

(30) Foreign Application Priority Data

Aug. 30, 2023 (CN) .......................... 202311114462.1

(51) Int. Cl.
*G10L 15/06* (2013.01)
*G06F 40/10* (2020.01)
(Continued)

(52) U.S. Cl.
CPC ............ *G10L 15/063* (2013.01); *G06F 40/10* (2020.01); *G06F 40/126* (2020.01); *G06F 40/20* (2020.01); *G10L 25/30* (2013.01)

(58) Field of Classification Search
CPC ....... G10L 25/30; G10L 15/063; G06F 40/10; G06F 3/167
See application file for complete search history.

(56) References Cited

U.S. PATENT DOCUMENTS 11,157,542 B2 * 10/2021 Li ......................... G06F 16/432
11,456,005 B2 * 9/2022 Mosseri ................. G10L 25/57
(Continued)

OTHER PUBLICATIONS

Huang, Qingqing, et al. "Mulan: A joint embedding of music audio and natural language." arXiv preprint arXiv:2208.12415 (2022).*
(Continued)

*Primary Examiner* — Shaun Roberts
(74) *Attorney, Agent, or Firm* — Alleman Hall LLP

(57) ABSTRACT

The present disclosure provides a multi-modal encoder processing method and apparatus, a computer device and a storage medium. The method includes: acquiring a pair of mask samples to be processed, the pair of mask samples including a text sample and an audio sample associated with each other, and at least one of the text sample and the audio sample is masked; based on a multi-modal encoder, generating a text encoding feature of the text sample, and generating an audio encoding feature of the audio sample, a linear spectrum feature of the audio sample being fused in the text encoding feature, and a linear word feature of the text sample being fused in the audio encoding feature; and predicting masked mask information according to the text encoding feature and the audio encoding feature, and correcting the multi-modal encoder based on an accuracy of the mask information.

20 Claims, 5 Drawing Sheets

(51) Int. Cl.
*G06F 40/126* (2020.01)
*G06F 40/20* (2020.01)
*G10L 25/30* (2013.01)

(56) References Cited

U.S. PATENT DOCUMENTS

| | | | | |
|---|---|---|---|---|
| 11,915,689 | B1 * | 2/2024 | Agostinelli | G10L 13/00 |
| 12,367,240 | B1 * | 7/2025 | Zhu | G06N 3/08 |
| 2022/0237368 | A1 * | 7/2022 | Tran | G06F 21/32 |
| 2023/0419989 | A1 * | 12/2023 | Gfeller | G10L 15/16 |
| 2024/0386048 | A1 * | 11/2024 | Russell | G06F 16/4393 |
| 2025/0225786 | A1 * | 7/2025 | Li | G06V 10/82 |

OTHER PUBLICATIONS

Elizalde, Benjamin, Shuayb Zarar, and Bhiksha Raj. "Cross modal audio search and retrieval with joint embeddings based on text and audio." ICASSP 2019-2019 IEEE International Conference on Acoustics, Speech and Signal Processing (ICASSP). IEEE, 2019.*

* cited by examiner

MULTI-MODAL ENCODER PROCESSING METHOD AND APPARATUS, COMPUTER DEVICE AND STORAGE MEDIUM

CROSS-REFERENCE TO RELATED APPLICATION(S)

This application claims priority to Chinese Application No. 202311114462.1 filed Aug. 30, 2023, the disclosure of which is incorporated herein by reference in its entirety.

FIELD

The present disclosure relates to the technical field of computers, and in particular to a multi-modal encoder processing method and apparatus, a computer device and a storage medium.

BACKGROUND

Multi-modal text, music learning and pre-training have intense application requirements in search and recommendation interaction scenarios. However, current mainstream multi-modal fusion learning methods are usually completed by a double-tower model in the form of comparison learning. Taking a self-attention mechanism based transformer model as an example, a unified network architecture thereof may seamlessly process a plurality of modalities, but it is necessary to manually convert an end task format according to a specific architecture, and parameters are not effectively shared between modalities in general, therefore it is difficult to implement effective fusion of multi-modal features.

SUMMARY

In view of this, embodiments of the present disclosure provide a multi-modal encoder processing method and apparatus, a computer device and a storage medium to solve the problem of it being difficult to implement effective fusion of multi-modal features.

In a first aspect, an embodiment of the present disclosure provides a multi-modal encoder processing method, including: acquiring a pair of mask samples to be processed, wherein the pair of mask samples includes a text sample and an audio sample associated with each other, and at least one of the text sample and the audio sample is masked; generating a text encoding feature of the text sample, and generating an audio encoding feature of the audio sample based on a multi-modal encoder, wherein a linear spectrum feature of the audio sample is fused in the text encoding feature, and a linear word feature of the text sample is fused in the audio encoding feature; and predicting masked mask information according to the text encoding feature and the audio encoding feature, and correcting the multi-modal encoder based on an accuracy of the mask information.

In the multi-modal encoder processing method provided in the embodiment of the present disclosure, an audio and a text are used as a fused modality, the text sample and the audio sample are masked, and during the encoding process the multi-modal encoder, the linear spectrum feature of the audio sample is fused in the text encoding feature, and the linear word feature of the text sample is fused in the audio encoding feature, so that the sharing of the audio feature and the text feature can be implemented by one training task, and specific encoding and cross-modal fusion of each modality can be effectively implemented.

In a second aspect, an embodiment of the present disclosure provides a multi-modal encoder processing apparatus, including: a sample acquisition module, configured to acquire a pair of mask samples to be processed, wherein the pair of mask samples includes a text sample and an audio sample associated with each other, and at least one of the text sample and the audio sample is masked; an encoding feature generation module, configured to: generate a text encoding feature of the text sample, and generate an audio encoding feature of the audio sample based on a multi-modal encoder, wherein a linear spectrum feature of the audio sample is fused in the text encoding feature, and a linear word feature of the text sample is fused in the audio encoding feature; and a correction module, configured to predict masked mask information according to the text encoding feature and the audio encoding feature, and correct the multi-modal encoder based on an accuracy of the mask information.

In a third aspect, an embodiment of the present disclosure provides a computer device, including: a memory and a processor, wherein the memory and the processor form a communication connection with each other, a computer instruction is stored in the memory, and the processor executes the computer instruction to execute the multi-modal encoder processing method in the above first aspect or any embodiment corresponding thereto.

In a fourth aspect, an embodiment of the present disclosure provides a computer-readable storage medium, storing a computer instruction thereon, wherein the computer instruction is configured to cause a computer to execute the multi-modal encoder processing method in the above first aspect or any embodiment corresponding thereto.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

DETAILED DESCRIPTION OF EMBODIMENTS

Figure 1:
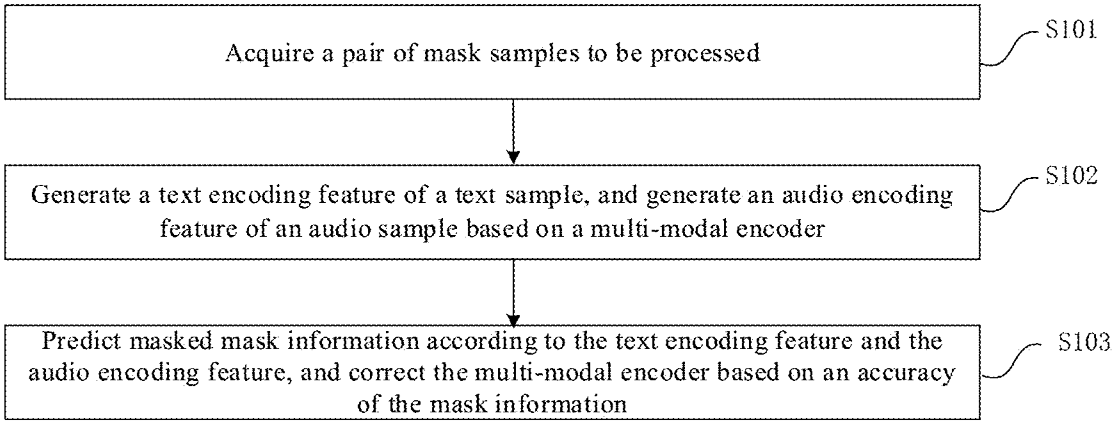
FIG. 1 is a schematic flowchart of a multi-modal encoder processing method according to an embodiment of the present disclosure.

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

Multi-modal text-music learning and pre-training have intense application requirements in search and recommendation interaction scenarios. However, current mainstream multi-modal fusion learning methods are usually completed by a double-tower model in the form of comparison learning.

The success of a transformer model has been transferred from a language to music and multi-modal issues. The unification of network architectures enables us to seamlessly process a plurality of modalities. Regarding music-language modeling, there are many manners to apply the Transformer model due to different properties of downstream tasks. For example, a dual-encoder architecture is used for efficient retrieval, an encoder-decoder network is used for generating tasks, and a fused encoder architecture is used for music-text encoding. However, most basic models require manual transformation of an end task format according to a particular architecture. In addition, parameters are not effectively shared between modalities in general.

Pre-training tasks based on mask data modeling have been successfully applied to various modalities, such as text, music, and a pair of music-text. A current music-language basic model usually performs other multi-task pre-training targets (e.g., music-text matching), so that the expansion is not friendly and the efficiency is low.

In view of this, in the present technical solution, the sharing of an audio feature and a text feature is implemented by one training task, and effective feature fusion may be performed on audio-text.

Specifically, a multi-way transformer model is used herein to perform universal modeling, that is, one unified architecture is used for various downstream tasks, and a modular network also comprehensively considers modal specific coding and cross-modal fusion.

A universal multi-modal base model is trained using only one pre-training task, that is, masking is performed and then prediction is performed. Text and music are processed in the same manner without basic modeling difference. Thus, a pair of audio-text is used as a "parallel sentence" to learn the alignment between modalities, which reflects the superiority of the generation pre-training of the unified architecture.

The size of the model is expanded to billions of parameters, so that the scale of pre-training data is expanded. Specifically, the model is composed of 40 layers of multi-way transformers, a hidden size is 1408, an intermediate size is 6144, and an attention header is 16. All layers include a music expert and a language expert. The music and language experts are also used in the first three layers of the multi-way transformer. A self-attention module is shared between different modalities and is separately pre-trained on single-modal data and multi-modal data, and the training process includes an audio sample, a text sample, and a pair of audio-text sample. Therefore, the generalization quality of the basic model is improved, and the basic model can be transferred to various downstream tasks.

According to embodiments of the present disclosure, provided is an embodiment of a multi-modal encoder processing method, it should be noted that steps shown in the flowcharts of the drawings may be executed in a computer system such as a group of computer-executable instructions, and although a logical order is shown in the flowcharts, in some cases, the steps shown or described may be executed in an order different from that herein.

In the present embodiment, provided is a multi-modal encoder processing method, which may be applied to a computer device, such as a notebook computer or a computer, FIG. 1 is a schematic flowchart of a multi-modal encoder processing method according to an embodiment of the present disclosure, and as shown in FIG. 1, the process includes the following steps:

Step S101: a pair of mask samples to be processed is acquired.

The pair of mask samples includes a text sample and an audio sample associated with the text sample, and at least one of the text sample and the audio sample is masked.

The text sample is preset description information for an audio, for example, "a segment of graceful piano accompaniment". The audio sample is various types of audio clips selected from an authorized audio library. The text sample is associated with the audio sample to obtain a corresponding pair of text-audio sample.

The pair of mask samples to be processed is a pair of samples composed of a text sample and an audio sample which are masked. Specifically, the text sample and/or the audio sample in the associated pair of text-audio samples is partially masked to obtain the pair of mask samples to be processed.

Step S102: a text encoding feature of the text sample is generated, and an audio encoding feature of the audio sample is generated based on a multi-modal encoder.

A linear spectrum feature of the audio sample is fused in the text encoding feature, and a linear word feature of the text sample is fused in the audio encoding feature.

The multi-modal encoder is a multi-layer transformer model, and each layer includes a self-attention layer and a multi-layer perceptron (MLP), which may encode the input text sample and the input audio sample, and output corresponding encoding features.

Specifically, the text sample is input into the multi-modal encoder for encoding processing, and the linear spectrum feature of the audio is fused in a text encoding process by a self-attention layer and an MLP layer, to generate the corresponding text encoding feature. Meanwhile, the audio sample is input into the multi-modal encoder for encoding processing, and the linear word feature of the text is fused in an audio encoding process by the self-attention layer and the MLP layer, to generate the corresponding audio encoding feature.

Step S103: masked mask information is predicted according to the text encoding feature and the audio encoding feature, and the multi-modal encoder is corrected based on an accuracy of the mask information.

As described above, since the linear spectrum feature of the audio sample is fused in the text encoding feature, the content of the audio sample may be better understood by text encoding, so that the masked audio sample can be predicted to determine the masked mask information in the audio sample.

Similarly, since the linear word feature of the text sample is fused in the audio encoding feature, the masked test sample may be predicted by the audio encoding feature to determine masked text mask information in the text sample.

After the masked mask information is predicted, the predicted mask information is compared with real mask information to determine the prediction accuracy of the mask information. Then, the multi-modal encoder may be corrected by the prediction accuracy, so that the multi-modal encoder can output text encoding features and audio encoding features having better accuracy.

In the multi-modal encoder processing method provided in the embodiment of the present disclosure, an audio and a text are used as a fused modality, the text sample and the audio sample are masked, and during the encoding process of the multi-modal encoder, the linear spectrum feature of the audio sample is fused in the text encoding feature, and the linear word feature of the text sample is fused in the audio encoding feature, so that the sharing of the audio feature and the text feature can be implemented by one training task, and specific encoding and cross-modal fusion of each modality can be effectively implemented.

Figure 2:
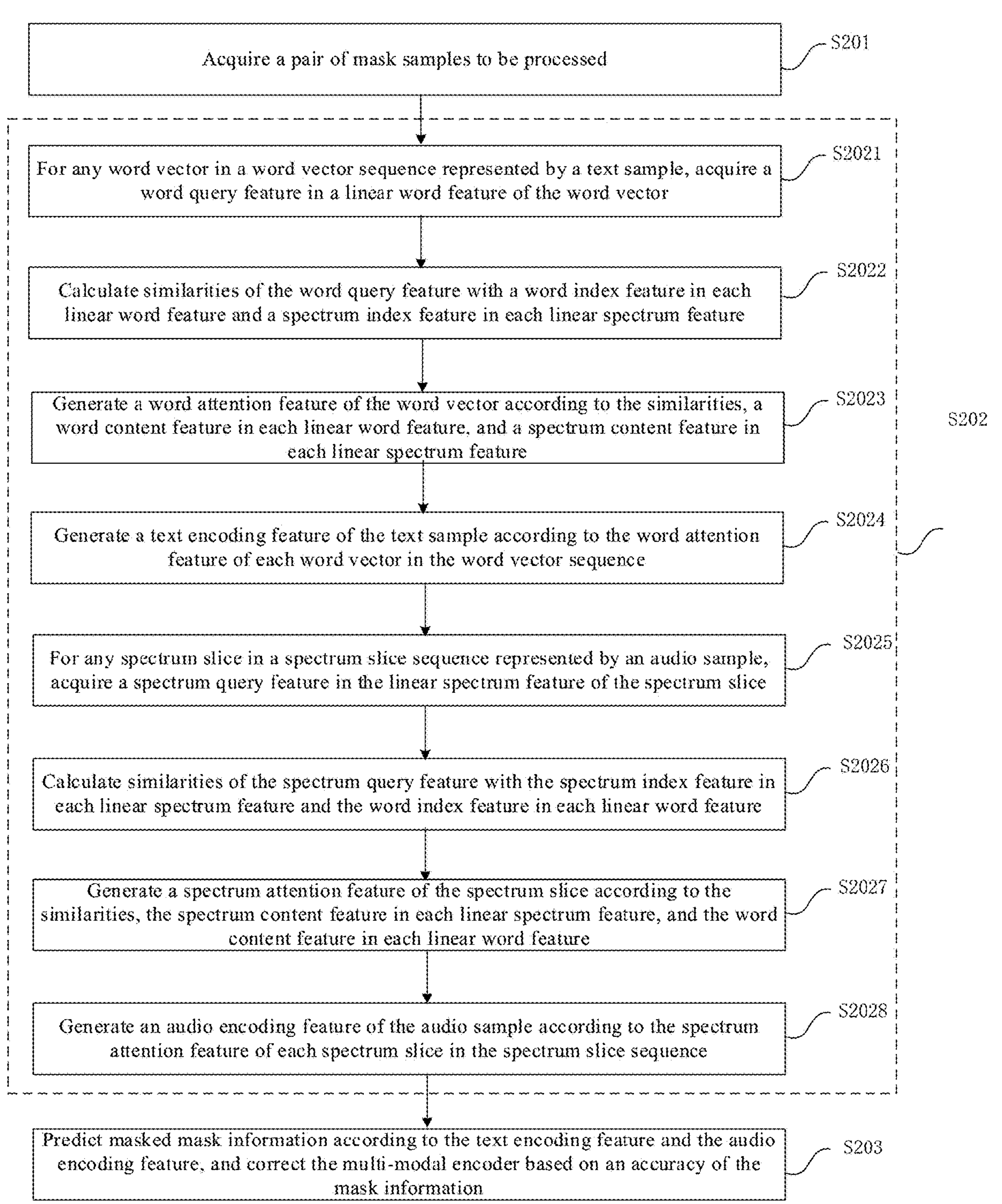
FIG. 2 is another schematic flowchart of a multi-modal encoder processing method according to an embodiment of the present disclosure.

In the present embodiment, provided is a multi-modal encoder processing method, which may be applied to a computer device, such as a notebook computer or a computer, FIG. 2 is a schematic flowchart of a multi-modal encoder processing method according to an embodiment of the present disclosure, and as shown in FIG. 2, the process includes the following steps:

Step S201: a pair of mask samples to be processed is acquired, wherein the pair of mask samples includes a text sample and an audio sample associated with each other, and at least one of the text sample and the audio sample is masked. For detailed description, reference may be made to corresponding related descriptions in the above embodiment, and thus details are not described herein again.

Step S202: a text encoding feature of the text sample is generated, and an audio encoding feature of the audio sample is generated based on a multi-modal encoder.

A linear spectrum feature of the audio sample is fused in the text encoding feature, and a linear word feature of the text sample is fused in the audio encoding feature. Specifically, the linear spectrum feature and the linear word feature are generated in the following manner:

Step a1: a word vector sequence corresponding to the text sample is generated, and a spectrum slice sequence corresponding to the audio sample is generated.

The word vector sequence includes a plurality of word vectors, and the spectrum slice sequence includes a plurality of spectrum slices.

The multi-modal encoder performs context content analysis on the text sample input thereto to implement word segmentation processing on the text sample to convert the text sample into the word vector sequence. Specifically, the steps of generating the word vector sequence corresponding to the text sample may include the following:

Step a11: word segmentation processing is performed on the text sample to obtain a phrase sequence. Here, the word segmentation processing may be performed on the text sample by using a word segmentation device, to obtain a plurality of phrases corresponding to the text sample. Then, the plurality of phrases is converted into a phrase sequence composed of one ID.

Step a12: a word vector of each phrase in the phrase sequence is generated to obtain the word vector sequence including each word vector. Here, the word vector corresponding to each phrase is determined by word embedding lookup, so that the word vector sequence corresponding to the phrase sequence can be obtained.

The multi-modal encoder performs spectrum analysis on the audio sample input thereto, to convert the audio sample into the spectrum slice sequence in combination with spectrum information. Specifically, the steps of generating the spectrum slice sequence corresponding to the audio sample may include the following:

Step a13: spectrum information of the audio sample is generated, and the spectrum information is sliced to generate the spectrum slice sequence including each spectrum slice. Different audio samples have different audio parameters, and spectra corresponding thereto are also different, so that the audio parameter of the audio sample may be analyzed to convert the audio sample into a music spectrum, that is, the spectrum information of the audio sample. Then, the spectrum information is sliced and processed to obtain the spectrum slice sequence composed of a plurality of spectrum slices.

In the above embodiment, the word vector sequence is constructed by performing word segmentation processing on the text sample, so that the linear feature of the text sample is conveniently extracted by the word vector sequence. Meanwhile, the spectrum slice sequence is constructed by slicing the spectrum information of the audio sample, so that the linear feature of the audio sample is conveniently extracted by the spectrum slice sequence.

Step a2: for any word vector in the word vector sequence, linear transformation on the word vector is performed to obtain a linear word feature of the word vector, wherein the linear word feature includes a word query feature, a word index feature and a word content feature.

Linear transformation is performed on any word vector in the word vector sequence by an attention mechanism of the multi-modal encoder in combination with the word query feature (Q), the word index feature (K) and the word content feature (V), to obtain the linear word feature corresponding to the word vector.

Step a3: for any spectrum slice in the spectrum slice sequence, linear transformation is performed on the spectrum slice to obtain a linear spectrum feature of the spectrum slice.

The linear spectrum feature includes a spectrum query feature, a spectrum index feature and a spectrum content feature.

Similarly, linear transformation is performed on any spectrum slice in the spectrum slice sequence by the attention mechanism of the multi-modal encoder in combination with the spectrum query feature (Q), the spectrum index feature (K) and the spectrum content feature (V), to obtain the linear spectrum feature corresponding to the spectrum slice.

In the above embodiment, the linear word feature and the linear spectrum feature are determined in a unified linear transformation manner, thereby facilitating subsequent fusion of the linear word feature and the linear spectrum feature.

Specifically, the step S202 may include the following:

Step S2021: for any word vector in the word vector sequence represented by the text sample, the word query feature in the linear word feature of the word vector is acquired.

As described above, the linear word feature includes the word query feature, the word index feature and the word content feature. Here, the self-attention layer of the multi-modal encoder may extract the word query feature corresponding to the word vector by analyzing the linear word feature.

Step S2022: similarities of the word query feature with the word index feature in each linear word feature and the spectrum index feature in each linear spectrum feature is calculated.

The word query feature, the word index feature and the spectrum index feature have consistent dimensions, and are all represented in the form of vectors. Specifically, point multiplication is separately performed on the word query feature with each word index feature and each spectrum index feature, that is, each word index feature corresponding to the text sample and each spectrum index feature corresponding to the audio sample are used as K, point multiplication is separately performed on the word query feature Q with each K to obtain a point multiplication result, and the point multiplication result is used for measuring the similarities of the word query feature with the word index feature in each linear word feature and the spectrum index feature in each linear spectrum feature.

Step S2023: a word attention feature of the word vector is generated according to the similarities, the word content feature in each linear word feature, and the spectrum content feature in each linear spectrum feature.

In order to ensure the stability of the linear transformation, scaling processing and normalization processing are performed on the obtained similarities to obtain processed similarity. Then, the processed similarity is multiplied by each word content feature and each spectrum content feature, that is, each word content feature corresponding to the text sample and each spectrum content feature corresponding to the audio sample are used as V, the processed similarity is multiplied by each K to obtain a product result, and the product result is determined as the word attention feature of the word vector.

Step S2024: the text encoding feature of the text sample is generated according to the word attention feature of each word vector in the word vector sequence.

The obtained word attention feature of each word vector is input into the multi-layer perceptron of the multi-modal encoder to perform text encoding processing to generate the corresponding text encoding feature, and since the frequency spectrum content feature and the spectrum index feature are fused in the word attention feature, the spectrum content feature and the spectrum index feature in the linear spectrum feature of the audio sample are fused in the text encoding feature output from the multi-modal encoder.

Step S2025: for any spectrum slice in the spectrum slice sequence represented by the audio sample, the spectrum query feature in the linear spectrum feature of the spectrum slice is acquired.

As described above, the linear spectrum feature includes the spectrum query feature, the spectrum index feature and the spectrum content feature. Here, the self-attention layer of the multi-modal encoder may extract the spectrum query feature corresponding to the spectrum slice by analyzing the linear spectrum feature.

Step S2026: similarities of the spectrum query feature with the spectrum index feature in each linear spectrum feature and the word index feature in each linear word feature are calculated.

Here, the calculation manner is similar with the manner of calculating similarities of the word query feature with the word index feature in each linear word feature and the spectrum index feature in each linear spectrum feature.

That is, each spectrum index feature and each word index feature are used as K, the spectrum query feature is used as Q, point multiplication is separately performed on the spectrum query feature Q with each K to obtain a point multiplication result, and the point multiplication results are used as the similarities of the spectrum query feature with the spectrum index feature in each linear spectrum feature and the word index feature in each linear word feature.

Step S2027: a spectrum attention feature of the spectrum slice is generated according to the similarities, the spectrum content feature in each linear spectrum feature, and the word content feature in each linear word feature.

Herein, the generation manner of the spectrum attention feature is similar to the generation manner of the word attention feature.

That is, each spectrum content feature and each word content feature are used as V, scaling processing and normalization processing are performed on the similarities obtained in the above step S2026 to obtain processed similarity. The processed similarity is multiplied by each K to obtain a product result, and the product result is determined as the spectrum attention feature.

Step S2028: the audio encoding feature of the audio sample is generated according to the spectrum attention feature of each spectrum slice in the spectrum slice sequence.

The obtained spectrum attention feature of each spectrum slice is input into the multi-layer perceptron of the multi-modal encoder to perform spectrum encoding processing to generate the corresponding audio encoding feature. Since the word content feature and the word index feature are fused in the spectrum attention feature, the word content feature and the word index feature in the linear word feature of the text sample are fused in the spectrum encoding feature output from the multi-modal encoder.

Step S203: masked mask information is predicted according to the text encoding feature and the audio encoding feature, and the multi-modal encoder is corrected based on an accuracy of the mask information. For detailed description, reference may be made to corresponding steps in the above embodiment, and thus details are not described herein again.

In the multi-modal encoder processing method provided in the present embodiment, the audio sample and the text sample are encoded as a whole by the unified architectured multi-modal encoder, when the audio sample and the text sample are input into the multi-modal encoder, the multi-modal encoder may fuse the linear feature of the audio modality in the text encoding feature to generate the text encoding feature, and may fuse the linear feature of the text modality in the audio encoding feature to generate the audio encoding feature. Therefore, a feature fusion capability of the multi-modal encoder is realized, and the understanding capability of the multi-modal encoder for input content thereof is improved.

Figures 3, 4:
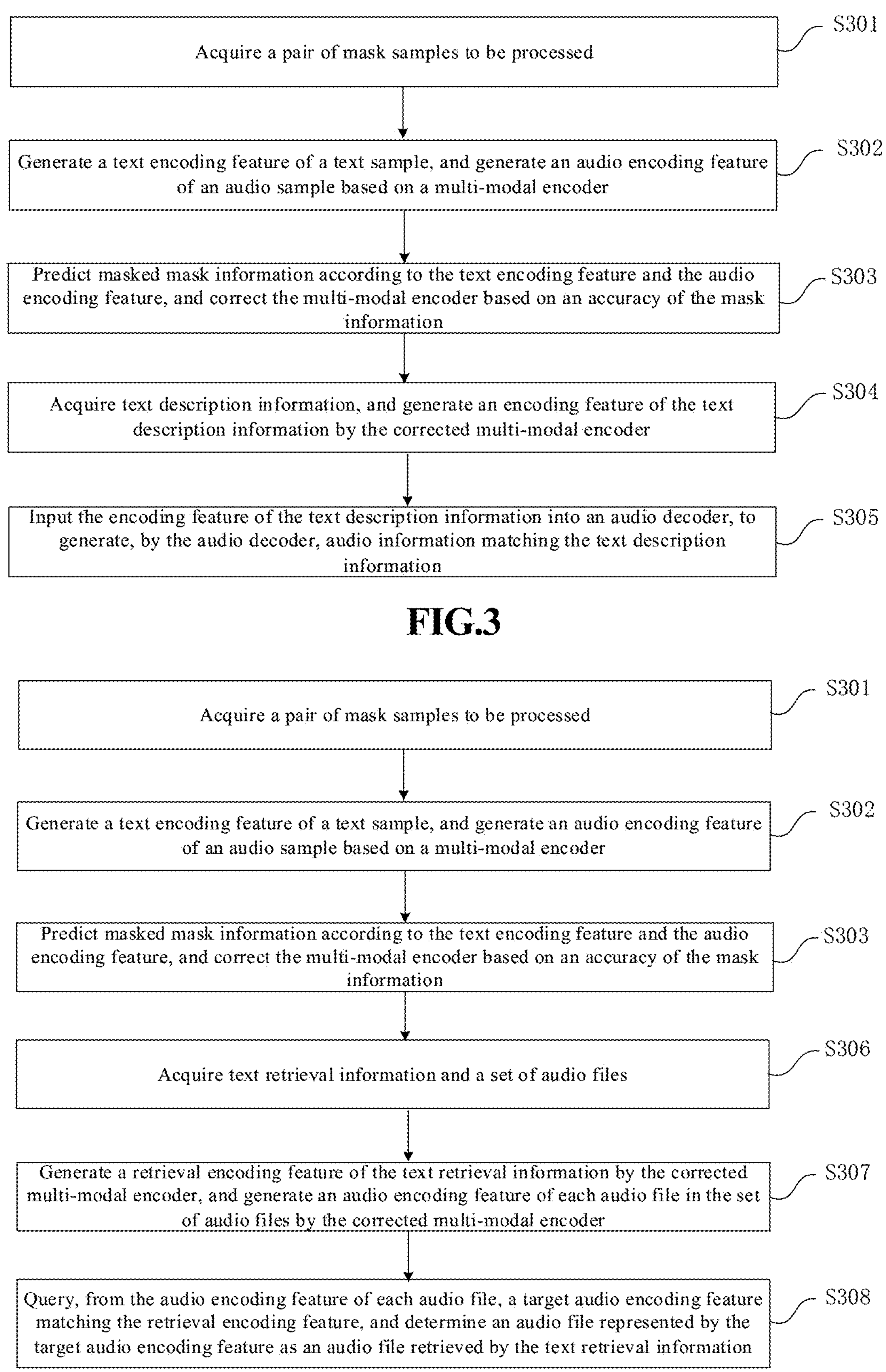
FIG. 3 is yet another schematic flowchart of a multi-modal encoder processing method according to an embodiment of the present disclosure.
FIG. 4 is still another schematic flowchart of a multi-modal encoder processing method according to an embodiment of the present disclosure.

In the present embodiment, provided is a multi-modal encoder processing method, which may be applied to a computer device, such as a notebook computer or a computer, FIG. 3 is a schematic flowchart of a multi-modal encoder processing method according to an embodiment of the present disclosure, and as shown in FIG. 3, the process includes the following steps:

Step S301: a pair of mask samples to be processed is acquired, wherein the pair of mask samples includes a text sample and an audio sample associated with each other, and at least one of the text sample and the audio sample is masked. For detailed description, reference may be made to corresponding related descriptions in the above embodiment, and thus details are not described herein again.

Step S302: a text encoding feature of the text sample is generated, and an audio encoding feature of the audio sample is generated based on a multi-modal encoder, wherein a linear spectrum feature of the audio sample is fused in the text encoding feature, and a linear word feature of the text sample is fused in the audio encoding feature. For detailed description, reference may be made to corresponding related descriptions in the above embodiment, and thus details are not described herein again.

Step S303: masked mask information is predicted according to the text encoding feature and the audio encoding feature, and the multi-modal encoder is corrected based on an accuracy of the mask information. For detailed description, reference may be made to corresponding steps in the above embodiment, and thus details are not described herein again.

Step S304: text description information is acquired, and an encoding feature of the text description information is generated by the corrected multi-modal encoder.

The text description information is a text input into the multi-modal encoder, and audio information to be matched with the multi-modal encoder is represented by the text description information. Specifically, the text description information may be input by a user, or may be selected from an authorized text library, and the manner of acquiring the text description information herein is not specifically limited herein.

The text description information is used as an input of the multi-modal encoder, and the multi-modal encoder may perform text expression vector extraction and encoding processing on the text description information, and output the encoding feature for the text description information.

Step S305: the encoding feature of the text description information is input into an audio decoder, to generate, by the audio decoder, audio information matching the text description information.

The audio decoder is a pre-trained model for outputting a matched audio according to the text description information. The multi-modal encoder uses the encoding feature of the text description information output therefrom as an input of the audio decoder, and the multi-modal encoder predicts, by the audio decoder, a music acoustic code matching the text description information to obtain audio information.

In some optional embodiments, the audio decoder may be trained in the following manner:

Step b1: a pair of training samples is acquired, wherein the pair of training samples includes a text description sample and an audio mask sample matching the text description sample, and the audio mask sample at least includes a part of known audio information;

step b2: the text description sample and the known audio information in the audio mask sample are processed by the audio decoder to predict masked audio information in the audio mask sample; and step b3: the audio decoder is corrected based on an accuracy of the masked audio information obtained by prediction.

The audio information is represented by the music acoustic code, and when the audio decoder is trained, the audio decoder predicts the masked music acoustic code by a text feature corresponding to the text description sample and the known music in the audio mask sample.

Then, the predicted music acoustic code is compared with a real music acoustic code to determine the prediction accuracy of the music decoder, parameters of the audio decoder are reversely adjusted by the prediction accuracy to correct the audio decoder, so that the audio decoder can accurately infer the audio information corresponding to the text description information.

In the multi-modal encoder processing method provided in the present embodiment, the matched audio information is determined by inputting the text description information, so that correct audio information can be inferred based on the text description information.

In some optional embodiments, after the corrected multi-modal encoder is obtained, as shown in FIG. 4, the above method may further include the following:

step S306: text retrieval information and a set of audio files are acquired.

The text retrieval information represents a retrieval description for the audio information. Specifically, the multi-modal encoder is deployed in the computer device, and the multi-modal encoder may acquire, in response to a text input operation triggered by a user, file retrieval information corresponding to the text input operation. The set of audio files is a set of various audio files, which may be acquired from the authorized audio library.

Step S307: a retrieval encoding feature of the text retrieval information is generated by the corrected multi-modal encoder, and an audio encoding feature of each audio file in the set of audio files is generated by the corrected multi-modal encoder.

The text retrieval information and the set of audio files are input into the multi-modal encoder, and the multi-modal encoder may extract a text expression vector of the text retrieval information to generate the retrieval encoding feature of the text retrieval information. Meanwhile, the multi-modal encoder extracts an audio expression vector of each audio file in the set of audio files to generate the audio encoding feature of each audio file.

Step S308: a target audio encoding feature matching the retrieval encoding feature is queried from the audio encoding feature of each audio file, and an audio file represented by the target audio encoding feature is determined as an audio file retrieved by the text retrieval information.

The similarity between the audio encoding feature of each audio file and the retrieval encoding feature is calculated separately, and the audio encoding feature with the highest similarity is determined. The audio encoding feature with the highest similarity is determined as the target audio encoding feature matching the retrieval encoding feature. The audio file represented by the target audio encoding feature is an audio file to be retrieved by the text retrieval information.

In the multi-modal encoder processing method provided in the present embodiment, the encoding features of the text and the audio are separately generated by the multi-modal encoder, and then the similarity between the encoding features is calculated to match the audio files with the text retrieval information, thereby implementing audio retrieval based on language understanding.

Figures 5, 6:
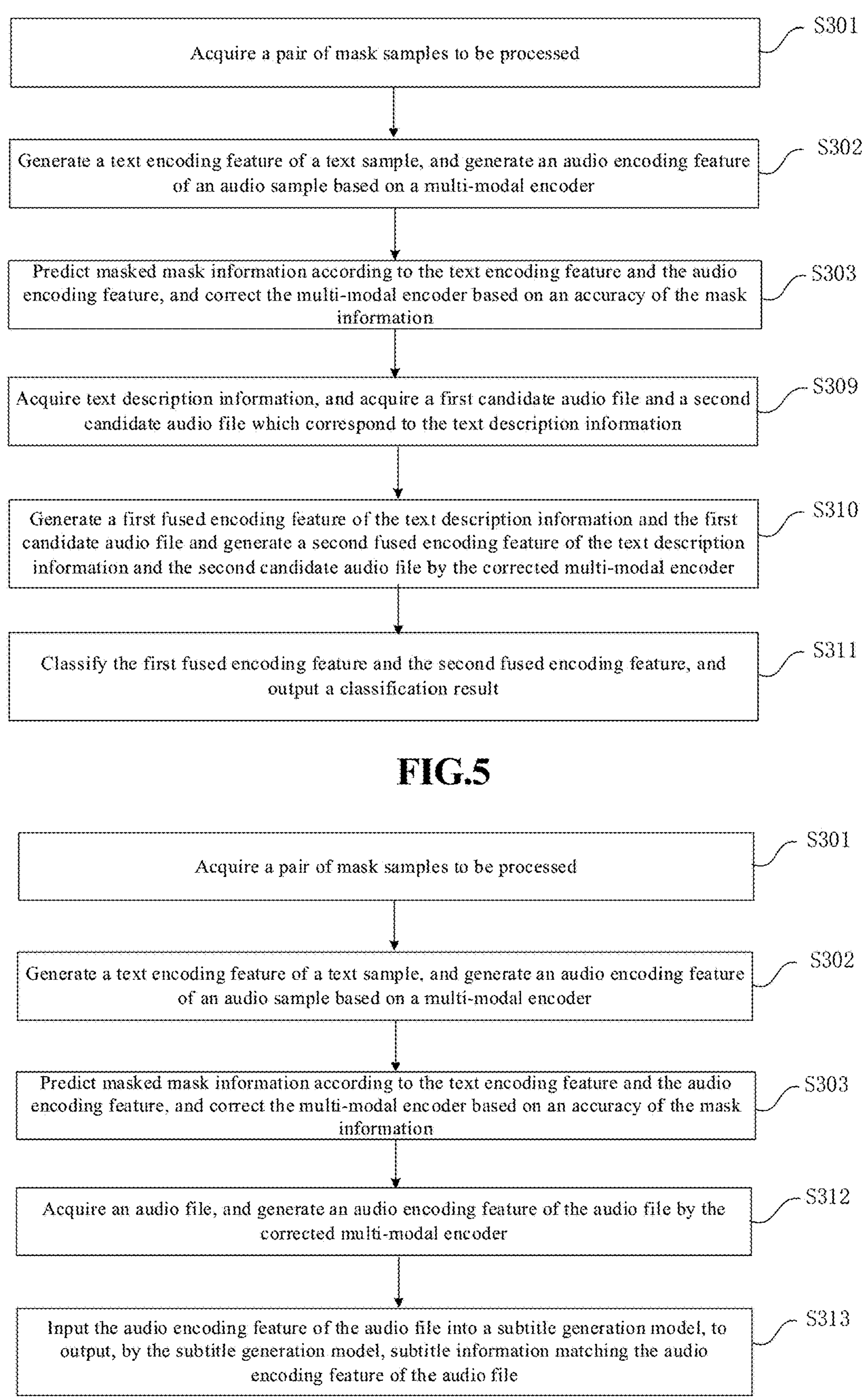
FIG. 5 is still another schematic flowchart of a multi-modal encoder processing method according to an embodiment of the present disclosure.
FIG. 6 is still another schematic flowchart of a multi-modal encoder processing method according to an embodiment of the present disclosure.

In some optional embodiments, after the corrected multi-modal encoder is obtained, as shown in FIG. 5, the above method may further include the following:

step S309: text description information is acquired, and a first candidate audio file and a second candidate audio file which correspond to the text description information are acquired.

The text description information is a text input into the multi-modal encoder, and audio information to be matched with text description information is represented by the text description information. Both the first candidate audio file and the second candidate audio file are audio files corresponding to the text description information. The text description information and the first candidate audio file are constructed as one pair of samples, and the text description information and the second candidate audio file are constructed as another pair of samples.

Step S310: a first fused encoding feature of the text description information and the first candidate audio file, and a second fused encoding feature of the text description information and the second candidate audio file are generated by the corrected multi-modal encoder.

The pair of samples constructed by the text description information and the first candidate audio file is input into the multi-modal encoder, and the text description information and the first candidate audio file are used as a whole, so that the first fused encoding feature of the pair of samples can be obtained. Similarly, the pair of samples constructed by the text description information and the first candidate audio file is input into the multi-modal encoder to obtain the corresponding second fused encoding feature.

Step S311: the first fused encoding feature and the second fused encoding feature are clarified, and a classification result is output, wherein the classification result represents an audio file that better matches the text description information in the first candidate audio file and the second candidate audio file.

The first fused encoding feature and the second fused encoding feature are classified by a classifier to determine an audio file having a higher matching degree with the text description information.

In the multi-modal encoder processing method provided in the present embodiment, the text and the audio files are used as a whole, and features of the text and the audio are fused in the encoding features output from the multi-modal encoder, instead of a single text feature or audio feature. Therefore, classification prediction is performed in combination with the fused features, and adaptive detection between the music and the text is implemented.

In some optional embodiments, after the corrected multi-modal encoder is obtained, as shown in FIG. 6, the above method may further include the following:

step S312: an audio file is acquired, and an audio encoding feature of the audio file is generated by the corrected multi-modal encoder.

The audio file may be input by the user, or may be randomly selected from a local authorized audio library, or may be downloaded from the cloud, and the manner of acquiring the audio file is not specifically limited herein.

The acquired audio file is used as an input of the multi-modal encoder, and the multi-modal encoder may perform audio expression vector extraction and encoding processing on the audio file to output the audio encoding feature for the audio file.

Step S313: the audio encoding feature of the audio file is input into a subtitle generation model, to output, by the subtitle generation model, subtitle information matching the audio encoding feature of the audio file.

The subtitle generation model is a pre-trained model for outputting matched subtitles according to the audio file. The multi-modal encoder uses the audio encoding feature output therefrom as an input of the subtitle generation model, and the multi-modal encoder predicts, by the subtitle generation model, characters matching the audio file to obtain corresponding subtitle information.

In some optional embodiments, the subtitle generation model may be trained in the following manner:

step c1: a pair of subtitle training samples is acquired, wherein the pair of subtitle training samples includes an audio file sample and a subtitle mask sample, and part of subtitle content in the subtitle mask sample is masked;

step c2: known subtitle content located in front of the masked subtitle content is determined in the subtitle mask sample, and the audio file sample and the known subtitle content are processed by the subtitle generation model, to restore the masked subtitle content in the subtitle mask sample; and step c3: the subtitle generation model is corrected based on an accuracy of the restored subtitle content.

When the subtitle generation model is trained, the masked subtitle content is predicted by an audio feature corresponding to the audio file sample and the known subtitle content in the subtitle mask sample (for example, in a case where the subtitle is a leftward subtitle, the known subtitle content is content in front of a mask). Then, by comparing the predicted subtitle content with real subtitle content in the mask subtitle content, the prediction accuracy of the subtitle content is determined, and parameters of the subtitle generation model are reversely adjusted by the prediction accuracy to correct the subtitle generation model, so that the subtitle generation model can accurately infer the subtitle content corresponding to the audio file.

In some optional embodiments, the subtitle mask sample further includes a masked subtitle ending identifier, and the above method may further include the following:

step d1: the audio file sample and the known subtitle content in the subtitle mask sample are processed by the subtitle generation model, to predict the position of the subtitle ending identifier in the subtitle mask sample; and step d2: the subtitle generation model is corrected based on an accuracy of the predicted position of the subtitle ending identifier.

The subtitle content usually has a special ending identifier, and the ending identifier may be masked during a training process of the subtitle generation model, so that the subtitle generation model predicts an ending position of the subtitle content by the audio file sample and the known subtitle content in the subtitle mask sample.

By comparing the predicted subtitle ending position with a real ending position, the prediction accuracy of the subtitle ending position is determined, and the parameters of the subtitle generation model are reversely adjusted by the prediction accuracy of the subtitle ending position, so that the subtitle generation model can infer a correct ending position of the subtitle content.

In the multi-modal encoder processing method provided in the present embodiment, the audio encoding feature corresponding to the audio file is output by the multi-modal encoder, and then corresponding subtitle information is determined in combination with the trained subtitle generation model, so that text information is generated based on the audio file.

In the present embodiment, further provided is a multi-modal encoder processing apparatus, which is used for implementing the above embodiments and preferred embodiments, and what have been described will not be repeated again. As used below, the term "module" may implement a combination of software and/or hardware of predetermined functions. Although the apparatus described in the following embodiments is preferably implemented in software, implementations of hardware or a combination of software and hardware are also possible and conceivable.

Figures 7, 8:
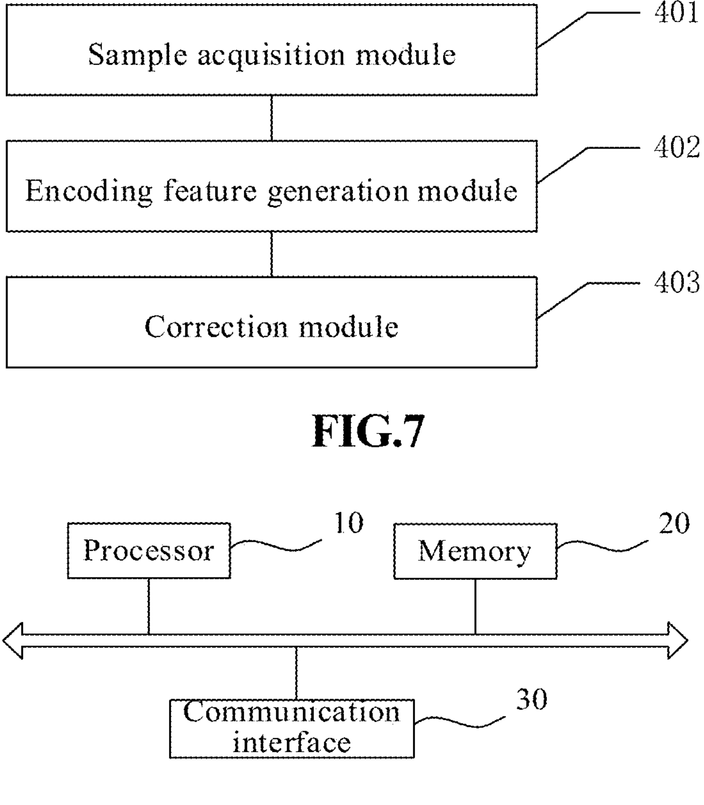
FIG. 7 is a structural block diagram of a multi-modal encoder processing apparatus according to an embodiment of the present disclosure.
FIG. 8 is a schematic diagram of a hardware structure of a computer device according to an embodiment of the present disclosure.

The present embodiment provides a multi-modal encoder processing apparatus, as shown in FIG. 7, including a sample acquisition module 401, an encoding feature generation module 402; and a correction module 403:

The sample acquisition module 401 is configured to acquire a pair of mask samples to be processed, wherein the pair of mask samples includes a text sample and an audio sample associated with each other, and at least one of the text sample and the audio sample is masked.

The encoding feature generation module 402 is configured to generate a text encoding feature of the text sample, and generate an audio encoding feature of the audio sample based on a multi-modal encoder, wherein a linear spectrum feature of the audio sample is fused in the text encoding feature, and a linear word feature of the text sample is fused in the audio encoding feature.

The correction module 403 is configured to predict masked mask information according to the text encoding feature and/or the audio encoding feature, and correct the multi-modal encoder based on an accuracy of the mask information.

In some optional embodiments, the encoding feature generation module 402 may include a sequence generation unit, a first linear transformation unit, and a second linear transformation unit:

The sequence generation unit is configured to generate a word vector sequence corresponding to the text sample, and generate a spectrum slice sequence corresponding to the audio sample, wherein the word vector sequence includes a plurality of word vectors, and the spectrum slice sequence includes a plurality of spectrum slices.

The first linear transformation unit is configured to: for any word vector in the word vector sequence, perform linear transformation on the word vector to obtain a linear word feature of the word vector, wherein the linear word feature includes a word query feature, a word index feature and a word content feature.

The second linear transformation unit is configured to: for any spectrum slice in the spectrum slice sequence, perform linear transformation on the spectrum slice to obtain a linear spectrum feature of the spectrum slice, wherein the linear spectrum feature includes a spectrum query feature, a spectrum index feature and a spectrum content feature.

In some optional embodiments, the sequence generation unit may include a word segmentation sub-unit, a vector generation sub-unit, and a slicing sub-unit:

The word segmentation sub-unit is configured to perform word segmentation processing on the text sample to obtain a phrase sequence.

The vector generation sub-unit is configured to generate a word vector of each phrase in the phrase sequence to obtain the word vector sequence including each word vector.

The slicing sub-unit is configured to generate spectrum information of the audio sample, and slice the spectrum information to generate the spectrum slice sequence including each spectrum slice.

In some optional embodiments, the encoding feature generation module 402 may include a first feature acquisition unit, a first similarity determination unit, a first attention feature generation unit, and a first encoding generation unit:

The first feature acquisition unit is configured to: for any word vector in the word vector sequence represented by the text sample, acquire the word query feature in the linear word feature of the word vector.

The first similarity determination unit is configured to calculate similarities of the word query feature with the word index feature in each linear word feature and the spectrum index feature in each linear spectrum feature.

The first attention feature generation unit is configured to generate a word attention feature of the word vector according to the similarities, the word content feature in each linear word feature, and the spectrum content feature in each linear spectrum feature.

The first encoding generation unit is configured to generate the text encoding feature of the text sample according to the word attention feature of each word vector in the word vector sequence.

In some optional embodiments, the encoding feature generation module 402 may further include a second feature acquisition unit, a second similarity determination unit, a second attention feature generation unit, and a second encoding generation unit:

The second feature acquisition unit is configured to: for any spectrum slice in the spectrum slice sequence represented by the audio sample, acquire the spectrum query feature in the linear spectrum feature of the spectrum slice.

The second similarity determination unit is configured to calculate similarities of the spectrum query feature with the spectrum index feature in each linear spectrum feature and the word index feature in each linear word feature.

The second attention feature generation unit is configured to generate a spectrum attention feature of the spectrum slice according to the similarities, the spectrum content feature in each linear spectrum feature, and the word content feature in each linear word feature.

The second encoding generation unit is configured to generate the audio encoding feature of the audio sample according to the spectrum attention feature of each spectrum slice in the spectrum slice sequence.

In some optional embodiments, the multi-modal encoder processing apparatus may further include a text information acquisition module and an audio decoding module:

The text information acquisition module is configured to acquire text description information, and generate an encoding feature of the text description information by the corrected multi-modal encoder.

The audio decoding module is configured to input the encoding feature of the text description information into an audio decoder, to generate, by the audio decoder, audio information matching the text description information.

In some optional embodiments, the audio decoding module includes an audio decoding training unit:

The audio decoding training unit is configured to train the audio decoder. Specifically, the audio decoding training unit is configured to: acquire a pair of training samples, wherein the pair of training samples includes a text description sample and an audio mask sample matching the text description sample, and the audio mask sample at least includes a part of known audio information; process the text description sample and the known audio information in the audio mask sample by the audio decoder to predict masked audio information in the audio mask sample; and correct the audio decoder based on an accuracy of the masked audio information obtained by prediction.

In some optional embodiments, the multi-modal encoder processing apparatus may further include a set acquisition module, a feature generation module, and a retrieval module:

The set acquisition module is configured to acquire text retrieval information and a set of audio files.

The feature generation module is configured to generate a retrieval encoding feature of the text retrieval information by the corrected multi-modal encoder, and generate an audio encoding feature of each audio file in the set of audio files by the corrected multi-modal encoder.

The retrieval module is configured to: query, from the audio encoding feature of each audio file, a target audio encoding feature matching the retrieval encoding feature, and determine an audio file represented by the target audio encoding feature as an audio file retrieved by the text retrieval information.

In some optional embodiments, the multi-modal encoder processing apparatus may further include a text and candidate audio acquisition module, a fusion encoding module, and a classification module:

The text and candidate audio acquisition module is configured to acquire text description information, and acquire a first candidate audio file and a second candidate audio file which correspond to the text description information.

The fusion encoding module is configured to generate a first fused encoding feature of the text description information and the first candidate audio file, and generate a second fused encoding feature of the text description information and the second candidate audio file by the corrected multi-modal encoder.

The classification module is configured to classify the first fused encoding feature and the second fused encoding feature, and output a classification result, wherein the classification result represents an audio file that better matches the text description information in the first candidate audio file and the second candidate audio file.

In some optional embodiments, the multi-modal encoder processing apparatus may further include an audio acquisition module and a subtitle generation module:

The audio acquisition module is configured to acquire an audio file, and generate an audio encoding feature of the audio file by the corrected multi-modal encoder.

The subtitle generation module is configured to input the audio encoding feature of the audio file into a subtitle generation model, to output, by the subtitle generation model, subtitle information matching the audio encoding feature of the audio file.

In some optional embodiments, the subtitle generation module may include a subtitle generation model training unit:

The subtitle generation model training unit is configured to train the subtitle generation model. Specifically, the subtitle generation model training unit is configured to: acquire a pair of subtitle training samples, wherein the pair of subtitle training samples includes an audio file sample and a subtitle mask sample, and part of subtitle content in the subtitle mask sample is masked; determine, in the subtitle mask sample, known subtitle content located in front of the masked subtitle content, and process the audio file sample and the known subtitle content by the subtitle generation model, to restore the masked subtitle content in the subtitle mask sample; and correct the subtitle generation model based on an accuracy of the restored subtitle content.

In some optional embodiments, the subtitle generation model training unit may be further configured to: process the audio file sample and the known subtitle content in the subtitle mask sample by the subtitle generation model, to predict the position of a subtitle ending identifier in the subtitle mask sample; and correct the subtitle generation model based on an accuracy of the predicted position of the subtitle ending identifier.

The further functional descriptions of the above modules and units are the same as those in the above corresponding embodiments, and thus details are not described herein again.

The multi-modal encoder processing apparatus in the present embodiment is presented in the form of a functional unit, and the unit herein refers to an ASIC circuit, a processor and a memory for executing one or more software or fixed programs, and/or other devices capable of providing the above functions.

In the multi-modal encoder processing apparatus provided in the present embodiment, when the multi-modal encoder performs encoding processing, the linear spectrum feature of the audio sample is fused in the text encoding feature, and the linear word feature of the text sample is fused in the audio encoding feature, so that the sharing of the audio feature and the text feature can be implemented by one training task, and specific encoding and cross-modal fusion of each modality can be effectively implemented.

An embodiment of the present disclosure further provides a computer device, including the multi-modal encoder processing apparatus shown in FIG. 7.

Referring to FIG. 8, FIG. 8 is a schematic structural diagram of a computer device provided in an optional embodiment of the present disclosure, as shown in FIG. 8, the computer device includes: one or more processors 10, a memory 20, and interfaces for connecting various components, wherein the interfaces include a high-speed interface and a low-speed interface. The various components form a communication connection with each other by using different buses, and may be installed on a common motherboard or installed in other manners as needed. The processor may process instructions executed inside the computer device, wherein the instructions include instructions stored in or on the memory to display graphical information of a GUI on an external input/output apparatus (e.g., a display device coupled to the interface). In some optional implementations, if necessary, a plurality of processors and/or a plurality of buses may be used together with a plurality of memories. Similarly, a plurality of computer devices may be connected, and each device provides some necessary operations (e.g., serving as a server array, a group of blade servers, or a multi-processor system). One processor 10 is taken as an example in FIG. 8.

The processor 10 may be a central processing unit, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable logic gate array, a general array logic, or any combination thereof.

The memory 20 stores instructions executable by at least one processor 10, so that the at least one processor 10 is caused to execute the method shown in the above embodiments.

The memory 20 may include a program storage area and a data storage area, wherein the program storage area may store an operating system and an application program required by at least one function; and the data storage area may store data created according to the use of the computer device. In addition, the memory 20 may include a high-speed random access memory, and may further include a non-transitory memory, for example, at least one magnetic disk storage device, a flash memory device, or other non-transitory solid-state storage devices. In some optional implementations, the memory 20 may optionally include memories which are remotely disposed relative to the processor 10, and these remote memories may be connected to the computer device by a network. Instances of the above network include, but are not limited to, the Internet, an intranet, a local area network, a mobile communication network, and a combination thereof.

The memory 20 may include a volatile memory, for example, a random access memory; the memory may also include a non-volatile memory, for example, a flash memory, a hard disk, or a solid state disk; and the memory 20 may further include a combination of the above types of memories.

The computer device further includes an input apparatus 30 and an output apparatus 40. The processor 10, the memory 20, the input apparatus 30 and the output apparatus 40 may be connected by using a bus or in other manners, and connected by using a bus is taken as an example in FIG. 8.

The input apparatus 30 may receive input digital or character information, and generate a key signal input related to user settings and function control of the computer device, such as a touch screen, a keypad, a mouse, a trackpad, a touchpad, an indicator rod, one or more mouse buttons, a trackball, a joystick, and the like. The output device 40 may include a display device, an auxiliary lighting apparatus (e.g., an LED), a tactile feedback apparatus (e.g., a vibration motor), and the like. The display device includes, but is not limited to, a liquid crystal display, a light-emitting diode, a display, and a plasma display. In some optional implementations, the display device may be a touch screen.

The computer device further includes a communications interface 30, configured to enable the computer device to communicate with other devices or communication networks.

An embodiment of the present disclosure further provides a computer-readable storage medium, the above method according to the embodiments of the present disclosure may be implemented in hardware or firmware, or may be implemented as computer codes, which may be recorded in the storage medium, or are downloaded from the network, are originally stored in a remote storage medium or a non-transitory machine-readable storage medium and will be stored in a local storage medium, so that the method described herein may be processed by software stored on a storage medium which uses a general-purpose computer, a dedicated processor, or programmable or dedicated hardware. The storage medium may be a magnetic disk, an optical disc, a read-only memory, a random access memory, a flash memory, a hard disk, a solid state disk, or the like; and further, the storage medium may further include a combination of the above types of memories. It should be understood that the computer, the processor, a microprocessor controller, or the programmable hardware includes a storage component capable of storing or receiving software or computer codes, and when the software or computer codes are accessed and executed by the computer, the processor or the hardware, the method shown in the above embodiments is implemented.

Although the embodiments of the present disclosure are described with reference to the drawings, those skilled in the art may make various modifications and variations without departing from the spirit and scope of the present disclosure, and such modifications and variations fall within the scope defined by the appended claims.

We claim:

1. A multi-modal encoder processing method, comprising:

acquiring a pair of mask samples to be processed, wherein the pair of mask samples comprises a text sample and an audio sample associated with each other, and at least one of the text sample and the audio sample is masked;

generating a text encoding feature of the text sample and generating an audio encoding feature of the audio sample based on a multi-modal encoder, wherein a linear spectrum feature of the audio sample is fused in the text encoding feature, and a linear word feature of the text sample is fused in the audio encoding feature; and predicting masked mask information according to the text encoding feature and the audio encoding feature, and correcting the multi-modal encoder based on an accuracy of the mask information.

2. The method according to claim 1, wherein the linear spectrum feature and the linear word feature are generated in the following manner:

generating a word vector sequence corresponding to the text sample, and generating a spectrum slice sequence corresponding to the audio sample, wherein the word vector sequence comprises a plurality of word vectors, and the spectrum slice sequence comprises a plurality of spectrum slices;

for any word vector in the word vector sequence, performing linear transformation on the word vector to obtain a linear word feature of the word vector, wherein the linear word feature comprises a word query feature, a word index feature and a word content feature; and for any spectrum slice in the spectrum slice sequence, performing linear transformation on the spectrum slice to obtain a linear spectrum feature of the spectrum slice, wherein the linear spectrum feature comprises a spectrum query feature, a spectrum index feature and a spectrum content feature.

3. The method according to claim 2, wherein generating the word vector sequence corresponding to the text sample and generating the spectrum slice sequence corresponding to the audio sample comprises:

performing word segmentation processing on the text sample to obtain a phrase sequence;

generating a word vector of each phrase in the phrase sequence to obtain the word vector sequence comprising each word vector; and generating spectrum information of the audio sample and slicing the spectrum information to generate the spectrum slice sequence comprising each spectrum slice.

4. The method according to claim 1, wherein generating the text encoding feature of the text sample comprises:

For any word vector in a word vector sequence represented by the text sample, calculating similarities of the word query feature with a word index feature in each linear word feature and a spectrum index feature in each linear spectrum feature;

Generating a word attention feature of the word vector according to the similarities, a word content feature in each linear word feature, and a spectrum content feature in each linear spectrum feature;

generating the text encoding feature of the text sample according to the word attention feature of each word vector in the word vector sequence.

5. The method according to claim 1, wherein generating the audio encoding feature of the audio sample comprises:

For any spectrum slice in a spectrum slice sequence represented by the audio sample, calculating similarities of the spectrum query feature with a spectrum index feature in each linear spectrum feature and a word index feature in each linear word feature;

generating a spectrum attention feature of the spectrum slice according to the similarities, a spectrum content feature in each linear spectrum feature, and a word content feature in each linear word feature;

generating the audio encoding feature of the audio sample according to the spectrum attention feature of each spectrum slice in the spectrum slice sequence.

6. The method according to claim 1, wherein the method further comprises: after obtaining the corrected multi-modal encoder, acquiring text description information, and generating an encoding feature of the text description information by the corrected multi-modal encoder; and inputting the encoding feature of the text description information into an audio decoder, to generate, by the audio decoder, audio information matching the text description information.

7. The method according to claim 6, wherein the audio decoder is trained in the following manner:

acquiring a pair of training samples, wherein the pair of training samples comprises a text description sample and an audio mask sample matching the text description sample, and the audio mask sample at least comprises a part of known audio information;

processing the text description sample and the known audio information in the audio mask sample by the audio decoder to predict masked audio information in the audio mask sample; and correcting the audio decoder based on an accuracy of the masked audio information obtained by prediction.

8. The method according to claim 1, wherein the method further comprises: after obtaining the corrected multi-modal encoder, acquiring text retrieval information and a set of audio files;

generating a retrieval encoding feature of the text retrieval information by the corrected multi-modal encoder, and generating an audio encoding feature of each audio file in the set of audio files by the corrected multi-modal encoder; and querying, from the audio encoding feature of each audio file, a target audio encoding feature matching the retrieval encoding feature, and determining an audio file represented by the target audio encoding feature as an audio file retrieved by the text retrieval information.

9. The method according to claim 1, wherein the method further comprises: after obtaining the corrected multi-modal encoder, acquiring text description information, and acquiring a first candidate audio file and a second candidate audio file which correspond to the text description information;

generating a first fused encoding feature of the text description information and the first candidate audio file and generating a second fused encoding feature of the text description information and the second candidate audio file by the corrected multi-modal encoder; and classifying the first fused encoding feature and the second fused encoding feature, and outputting a classification result, wherein the classification result represents an audio file that better matches the text description information in the first candidate audio file and the second candidate audio file.

10. The method according to claim 1, wherein the method further comprises: after obtaining the corrected multi-modal encoder, acquiring an audio file, and generating an audio encoding feature of the audio file by the corrected multi-modal encoder; and inputting the audio encoding feature of the audio file into a subtitle generation model, to output, by the subtitle generation model, subtitle information matching the audio encoding feature of the audio file.

11. The method according to claim 10, wherein the subtitle generation model is trained in the following manner:

acquiring a pair of subtitle training samples, wherein the pair of subtitle training samples comprises an audio file sample and a subtitle mask sample, and part of subtitle content in the subtitle mask sample is masked;

determining, in the subtitle mask sample, known subtitle content located in front of the masked subtitle content, and processing the audio file sample and the known subtitle content by the subtitle generation model, to restore the masked subtitle content in the subtitle mask sample; and correcting the subtitle generation model based on an accuracy of the restored subtitle content.

12. The method according to claim 11, wherein the subtitle mask sample further comprises a masked subtitle ending identifier, and the method further comprises:

processing the audio file sample and the known subtitle content in the subtitle mask sample by the subtitle generation model, to predict a position of the subtitle ending identifier in the subtitle mask sample; and correcting the subtitle generation model based on an accuracy of the predicted position of the subtitle ending identifier.

13. An electronic device, comprising: a memory and a processor, wherein the memory is configured to store a computer program, and the computer program, when executed by the processor, implements:

acquiring a pair of mask samples to be processed, wherein the pair of mask samples comprises a text sample and an audio sample associated with each other, and at least one of the text sample and the audio sample is masked;

generating a text encoding feature of the text sample and generating an audio encoding feature of the audio sample based on a multi-modal encoder, wherein a linear spectrum feature of the audio sample is fused in the text encoding feature, and a linear word feature of the text sample is fused in the audio encoding feature; and predicting masked mask information according to the text encoding feature and the audio encoding feature, and correcting the multi-modal encoder based on an accuracy of the mask information.

14. The electronic device according to claim 13, wherein the linear spectrum feature and the linear word feature are generated in the following manner:

generating a word vector sequence corresponding to the text sample, and generating a spectrum slice sequence corresponding to the audio sample, wherein the word vector sequence comprises a plurality of word vectors, and the spectrum slice sequence comprises a plurality of spectrum slices;

for any word vector in the word vector sequence, performing linear transformation on the word vector to obtain a linear word feature of the word vector, wherein the linear word feature comprises a word query feature, a word index feature and a word content feature; and for any spectrum slice in the spectrum slice sequence, performing linear transformation on the spectrum slice to obtain a linear spectrum feature of the spectrum slice, wherein the linear spectrum feature comprises a spectrum query feature, a spectrum index feature and a spectrum content feature.

15. The electronic device according to claim 14, wherein generating the word vector sequence corresponding to the text sample and generating the spectrum slice sequence corresponding to the audio sample comprises:

performing word segmentation processing on the text sample to obtain a phrase sequence;

generating a word vector of each phrase in the phrase sequence to obtain the word vector sequence comprising each word vector; and generating spectrum information of the audio sample and slicing the spectrum information to generate the spectrum slice sequence comprising each spectrum slice.

16. The electronic device according to claim 13, wherein generating the text encoding feature of the text sample comprises:

For any word vector in a word vector sequence represented by the text sample;

calculating similarities of the word query feature with a word index feature in each linear word feature and a spectrum index feature in each linear spectrum feature;

Generating a word attention feature of the word vector according to the similarities, a word content feature in each linear word feature, and a spectrum content feature in each linear spectrum feature;

generating the text encoding feature of the text sample according to the word attention feature of each word vector in the word vector sequence.

17. The electronic device according to claim 13, wherein generating the audio encoding feature of the audio sample comprises:

For any spectrum slice in a spectrum slice sequence represented by the audio sample, calculating similarities of the spectrum query feature with a spectrum index feature in each linear spectrum feature and a word index feature in each linear word feature;

generating a spectrum attention feature of the spectrum slice according to the similarities, a spectrum content feature in each linear spectrum feature, and a word content feature in each linear word feature;

generating the audio encoding feature of the audio sample according to the spectrum attention feature of each spectrum slice in the spectrum slice sequence.

18. The electronic device according to claim 13, wherein the computer program further implements: after obtaining the corrected multi-modal encoder, acquiring text description information, and generating an encoding feature of the text description information by the corrected multi-modal encoder; and inputting the encoding feature of the text description information into an audio decoder, to generate, by the audio decoder, audio information matching the text description information.

19. The electronic device according to claim 18, wherein the audio decoder is trained in the following manner:

acquiring a pair of training samples, wherein the pair of training samples comprises a text description sample and an audio mask sample matching the text description sample, and the audio mask sample at least comprises a part of known audio information;

processing the text description sample and the known audio information in the audio mask sample by the audio decoder to predict masked audio information in the audio mask sample; and correcting the audio decoder based on an accuracy of the masked audio information obtained by prediction.

20. A non-transitory computer-readable storage medium, configured to store a computer program, wherein the computer program, when executed by a processor, implements:

acquiring a pair of mask samples to be processed, wherein the pair of mask samples comprises a text sample and an audio sample associated with each other, and at least one of the text sample and the audio sample is masked;

generating a text encoding feature of the text sample and generating an audio encoding feature of the audio sample based on a multi-modal encoder, wherein a linear spectrum feature of the audio sample is fused in the text encoding feature, and a linear word feature of the text sample is fused in the audio encoding feature; and predicting masked mask information according to the text encoding feature and the audio encoding feature, and correcting the multi-modal encoder based on an accuracy of the mask information.

* * * * *